United States Patent
Geiger et al.

(10) Patent No.: US 10,274,080 B2
(45) Date of Patent: Apr. 30, 2019

(54) METHOD FOR OPERATING A POWER SPLIT TRANSMISSION

(71) Applicant: ZF Friedrichshafen AG, Friedrichshafen (DE)

(72) Inventors: Simon Geiger, Oberteuringen (DE); Matthias Madlener, Hohentengen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 331 days.

(21) Appl. No.: 15/389,584

(22) Filed: Dec. 23, 2016

(65) Prior Publication Data
US 2017/0198811 A1 Jul. 13, 2017

(30) Foreign Application Priority Data
Jan. 11, 2016 (DE) .................. 10 2016 200 191

(51) Int. Cl.
*F16H 61/16* (2006.01)
*F16H 61/70* (2006.01)
*F16H 61/10* (2006.01)
*F16H 47/02* (2006.01)

(52) U.S. Cl.
CPC .......... *F16H 61/16* (2013.01); *F16H 61/702* (2013.01); *B60Y 2400/72* (2013.01); *F16H 47/02* (2013.01); *F16H 61/10* (2013.01); *F16H 2061/166* (2013.01); *F16H 2306/24* (2013.01)

(58) Field of Classification Search
None
See application file for complete search history.

(56) References Cited

U.S. PATENT DOCUMENTS

| 5,683,322 A * | 11/1997 | Meyerle .................. B60T 1/093 475/72 |
| 5,944,630 A * | 8/1999 | Omote .................... B60K 6/365 477/5 |
| 2003/0125154 A1* | 7/2003 | Miyata .................. F16H 61/061 475/208 |
| 2016/0214615 A1* | 7/2016 | Zollner ................. B60W 30/19 |
| 2016/0368483 A1* | 12/2016 | Nawata ................. B60W 10/06 |

FOREIGN PATENT DOCUMENTS

| DE | 195 10 179 A1 | 9/1995 |
| DE | 196 41 723 A1 | 6/1997 |
| DE | 10 2006 055 724 A1 | 5/2008 |
| DE | 10 2012 218 974 A1 | 6/2013 |

OTHER PUBLICATIONS

German Search Report Corresponding to 10 2016 200 191.4 dated Oct. 26, 2016.

* cited by examiner

*Primary Examiner* — Justin Holmes
(74) *Attorney, Agent, or Firm* — Davis & Bujold PLLC; Michael J. Bujold

(57) ABSTRACT

During a shift from a first driving range to a second driving range in a continuously variable power-split transmission having a continuously variable branch and a mechanical branch, in which during the range shift, the synchronous rotation speed is kept constant, the range shift is discontinued if a predefined threshold of at least one driving requirement is exceeded.

8 Claims, 5 Drawing Sheets

METHOD FOR OPERATING A POWER SPLIT TRANSMISSION

This application claims priority from German patent application serial no. 10 2016 200 191.4 filed Jan. 11, 2016.

FIELD OF THE INVENTION

The invention concerns a method for operating a power-split transmission.

BACKGROUND OF THE INVENTION

Power-split transmissions of the type concerned have a continuously variable power branch, which can be made for example as a hydrostatic power branch or an electric power branch, and a mechanical power branch, which are summed together by means of a totalizing gear system. In addition, power-split transmissions of this type have at least two driving ranges which can be engaged by means of clutches and within which the drive output rotational speed of the power-split transmission can be varied continuously.

DE 102006055724A1 discloses a hydrostatic-mechanical power-split transmission of this type, in which the shift from a first driving range to a second driving range takes place with synchronous rotational speed, in order to achieve good shift quality without shift jerks. During the shift from one driving range to the other driving range, the transmission ratio in the continuously variable power branch is kept constant, so that the synchronous point remains unchanged during the shift.

SUMMARY OF THE INVENTION

The purpose of the present invention is to provide a method for operating a power-split transmission, by means of which a vehicle driver obtains reproducible and easily understood reactions of the vehicle to his commands.

The objective of the invention is achieved by a method of the type concerned, which also embodies the characterizing features of the principal claim.

The invention is based on the recognition that a power-split transmission will keep the transmission ratio constant in the continuously variable branch until a shift from one range to the next range has been completed. However, if precisely during the shift from one range to the next range the vehicle driver's requirements change, for example in that the vehicle driver suddenly releases the accelerator pedal and in addition, for example, actuates the service brakes, then the vehicle driver expects that the transmission will promptly change the transmission ratio so as to brake the vehicle. But since a transmission ratio change can only be carried out after the completion of the range shift, the method according to the invention requires the interruption of a range shift as a function of modified driver requirements.

To describe the interruption of a range shift in more detail, a range shift carried out completely without any interruption will first be described. The range shift described is in this case an upshift, for example from a first driving range to a second driving range, whereas a downshift for example from the second to the first driving range takes place in the reverse sequence.

From data concerning an accelerator pedal or some other signal that indicates a wish to accelerate, an electronic control unit recognizes that the driver's wish is for further acceleration of the vehicle. From data concerning the currently existing, or data concerning the current nominal dynamics and the transmission ratio distance from the synchronous point, the electronic control unit calculates the time period required until the synchronous rotation speed for carrying out the change of driving range is reached. Depending on that time period, and provided that other boundary conditions are fulfilled, the range clutch to be engaged is pre-filled with hydraulic fluid and then actuated in the closing direction until it has closed. When the range clutch being closed has been closed, the electronic control unit recognizes that the driving range shift is active. So long as the driving range shift is active the transmission ratio of the continuously variable power branch is first adjusted to the synchronous point and then kept there actively. The transmission ratio is kept constant until the electronic control unit recognizes that the driving range shift is no longer active. The driving range shift is no longer active when a predefined time interval has lapsed after the clutch to be disengaged has been operated fully in its opening direction. The time required for the closing clutch to be closed is referred to as the first section. After a predefined time interval has lapsed, during which the clutch to be engaged and the clutch to be disengaged are both actuated in the closing direction, the clutch to be disengaged is actuated in its opening direction. While the clutch to be disengaged is actuated in the opening direction, this is referred to as the second section of the shift. When the driving range shift has been completed and the transmission ratio is still in the area of the synchronous point, then a further driving range shift is blocked for a defined time interval in order to prevent continual shifting back and forth, the so-termed shift alternation. This time interval is also known as the third section.

Now if, during this driving range change, in which the transmission ratio of the continuously variable power branch has been compelled to remain constant, the driver's wish changes beyond a predefined threshold amount, then the driving range shift is not carried to completion but discontinued and, depending on the section in which the driving range shift is at the time, either the clutch to be disengaged is not opened at all or, if it is already being actuated in the opening direction, it is closed again in order to leave the time window of the active driving range change as quickly as possible so as to be able once more to vary the transmission ratio of the continuously variable power branch. The electronic control unit recognizes that the driver's requirements have changed if, during the shift from the first driving range to the second driving range, either a reversing command is recognized, or an angle of an accelerator pedal is changed by more than a predefined value, and/or an internal combustion engine driving the transmission exceeds a predefined compression, and/or an external or internal drive output rotation speed demand exceeds a predefined value, and/or a nominal gradient of the transmission exceeds a predefined value, and/or a high-pressure regulator exceeds a predefined value, and/or a driving range wish or a driving range restriction, for example only driving range 1), is commanded, and/or the throttle control exceeds a predefined value.

BRIEF DESCRIPTION OF THE DRAWINGS

Further characteristics emerge from the description of the figures, which show.

DETAILED DESCRIPTION OF THE PREFERRED EMBODIMENTS

Figure 1:
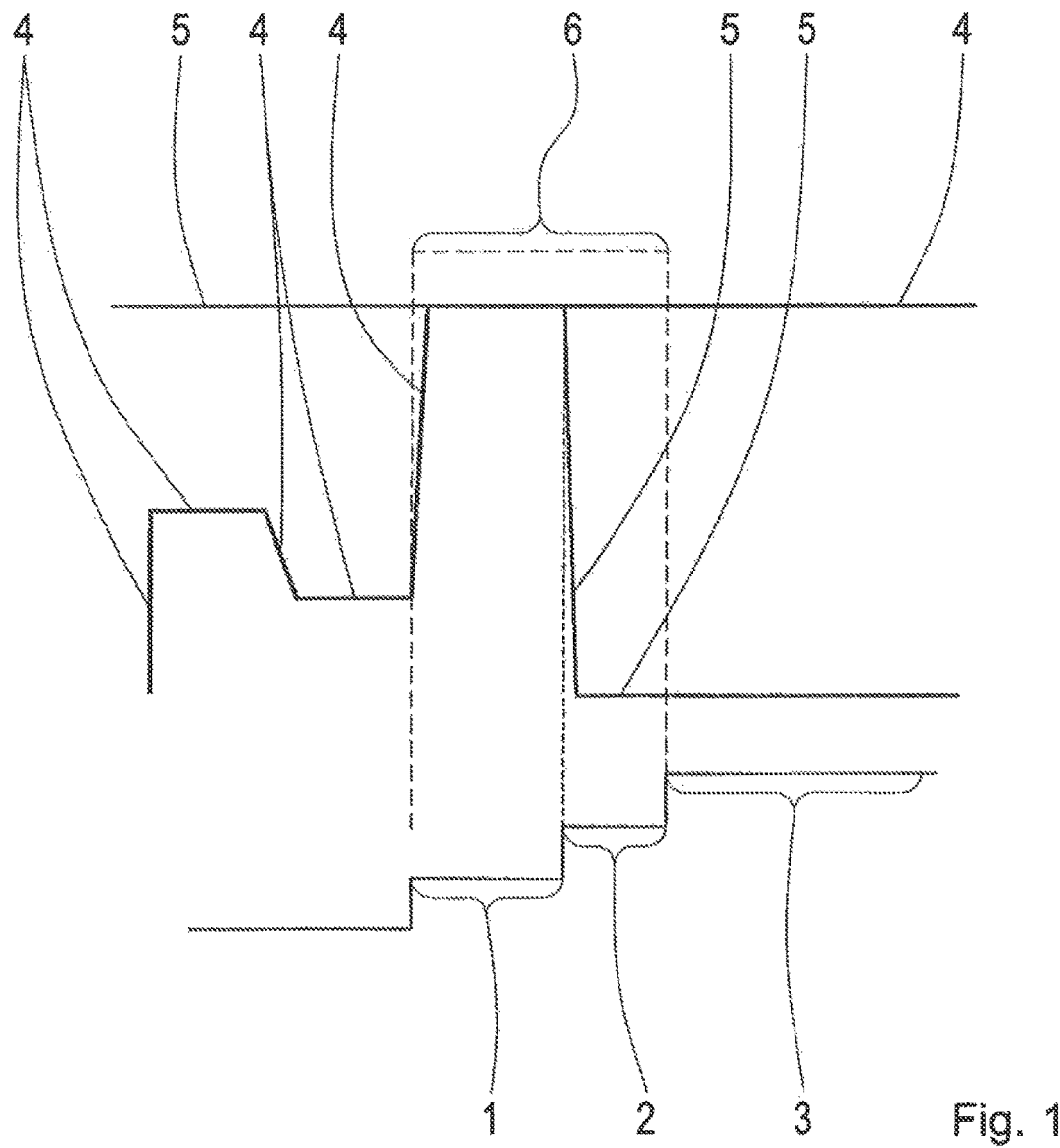
FIG. 1: A time diagram of a complete range shift from a first driving range to a second driving range, in this case an upshift.
Figure 2:
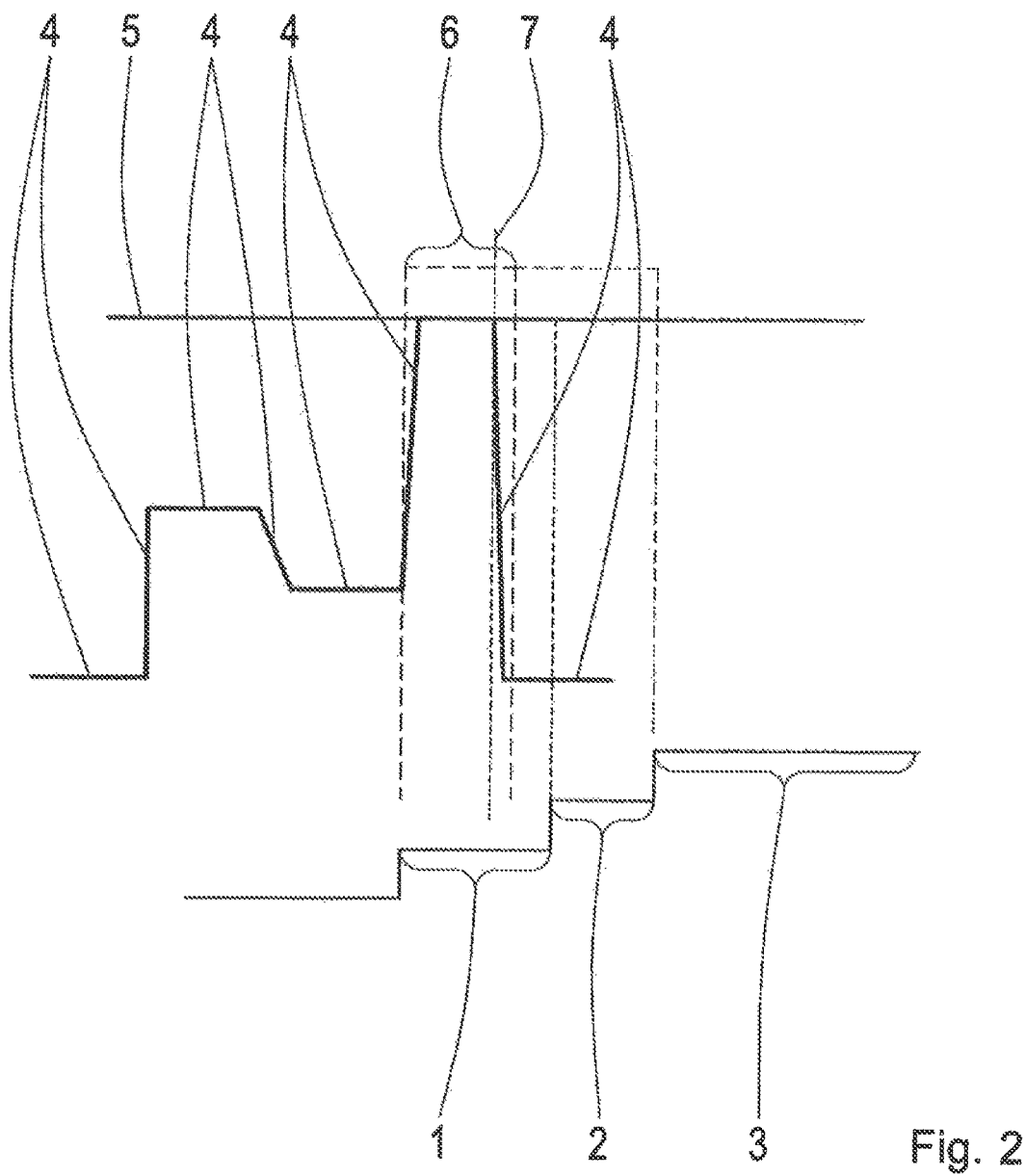
FIG. 2: An interruption of the driving range shift within the first section.
Figure 3:
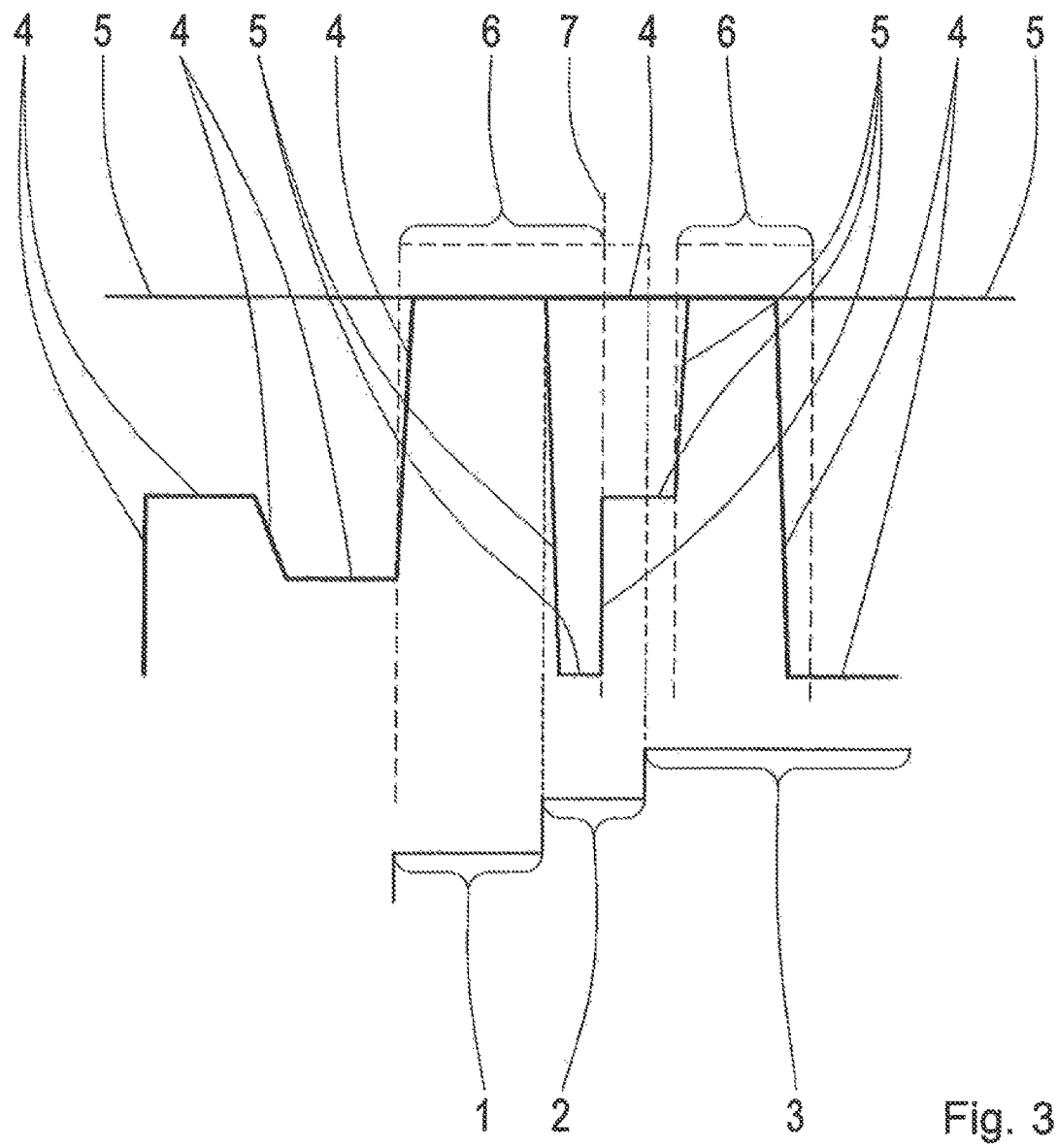
FIG. 3: A change of the driving range in the second section.
Figure 4:
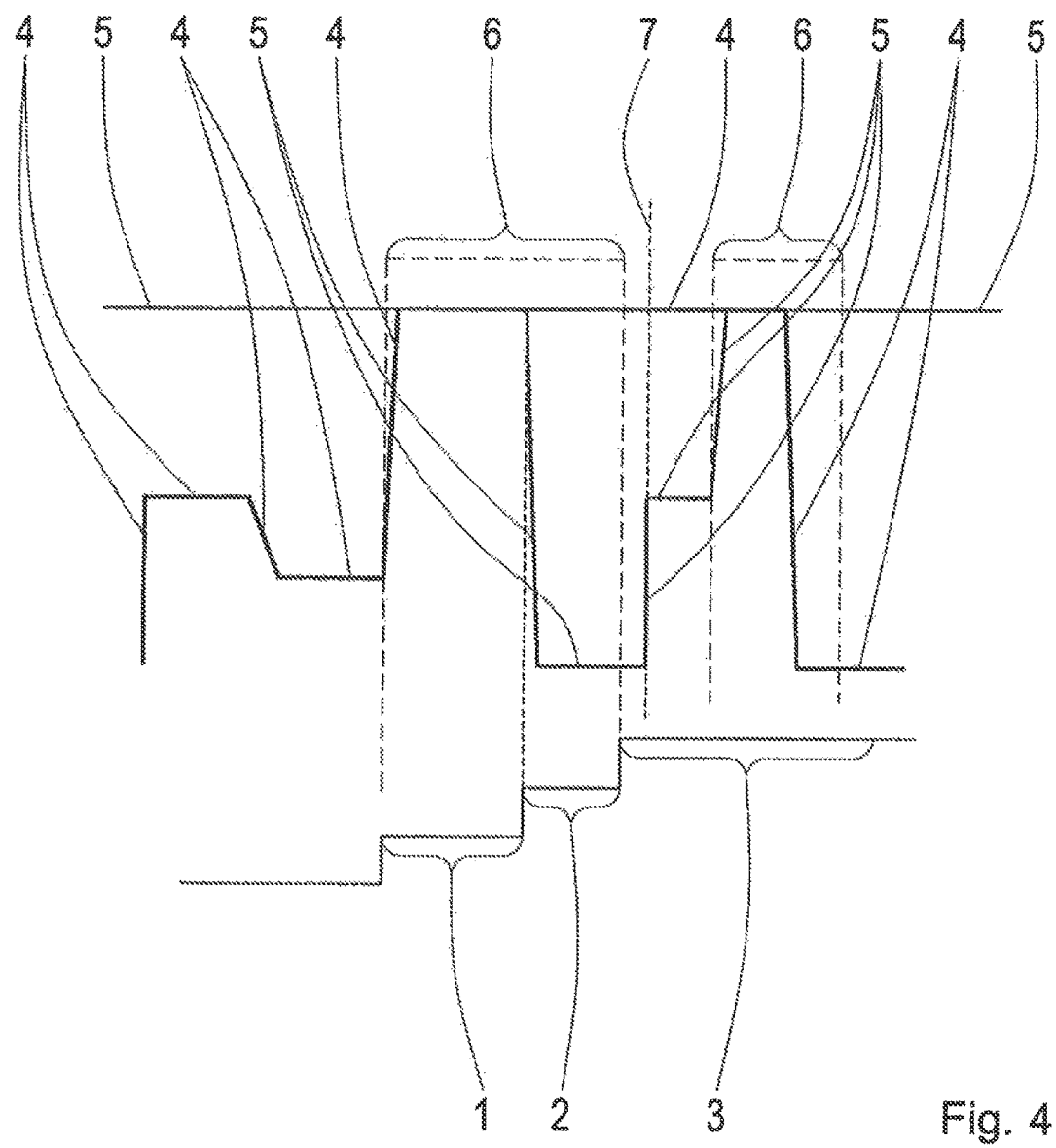
FIG. 4: A change of the driving range in the third section.
Figure 5:
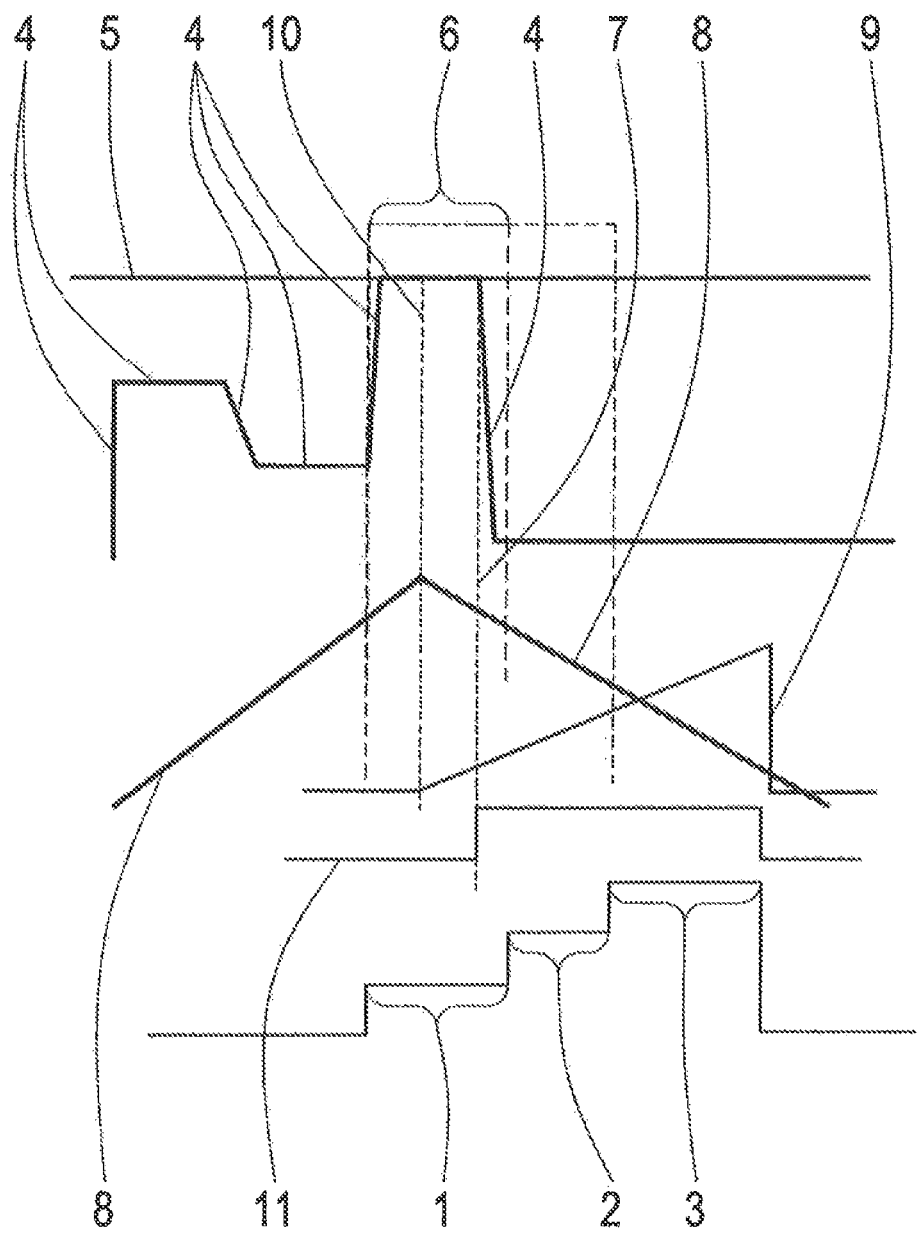
FIG. 5: An interruption of the driving range shift in the first section due to the recognition of a change of the nominal drive output rotation speed.

FIG. 1:

The ordinate shows the variation of the hydraulic pressures with which the clutch to be engaged and the clutch to be disengaged are acted upon. The clutch is in its closed condition when under high pressure and in its open condition when under low pressure. Closed condition means that the clutch can transmit torque. Open condition means that the clutch cannot transmit any torque. The time variation is shown along the abscissa. Before the first section 1 the clutch to be engaged is pre-filled with hydraulic fluid, so that the pressure 4 of the clutch to be engaged is above its base level. Likewise, before the first section 1 the pressure 5 of the clutch to be disengaged is at its maximum level or at a level at which the clutch to be disengaged is still closed and friction-locked. For this the pressure level does not necessarily have to correspond to the maximum pressure. At the beginning of the first section 1 the pressure 4 of the clutch to be engaged is increased to its closing level, whereby the clutch to be engaged is actuated in its closing direction. At the same time the driving range change signal 6 is activated, and remains active until the end of the second section 2. While the driving range change signal 6 is set to active, the transmission ratio of the continuously variable power branch remains constant. At the end of the first section 1 and the beginning of the second section 2, the pressure 5 of the clutch to be disengaged is reduced so that the clutch is actuated in the opening direction. When the pressure 5 of the clutch to be disengaged is at its low level and a certain safety time interval has lapsed to ensure that the said clutch is in the open condition, the end of the second section is reached. The transmission ratio of the continuously variable power branch no longer has to be kept constant after the end of the second section 2 or the end of the active period of the driving range change signal 6. But if the rotational speed still remains within a predefined range close to the synchronous point, then the transmission is in the third section 3.

FIG. 2:

As far as the interruption of the driving range change, the numbering and description are identical to those for FIG. 1. If in the first section the driving demand changes in such manner that the electronic control unit recognizes a wish to discontinue the process and the shift for changing the driving range is still in the first section 1, the driving range change interruption 7 takes place in that the pressure of the clutch being engaged is immediately reduced to its base level and when it has reached the base level and after a safety interval the driving range change signal 6 is switched off again, so that a transmission ratio adjustment is possible immediately. This considerably shortens the driving range shift and the driver's demand can be implemented at once. Thus, the driver of the vehicle can modify his needs directly and will receive a direct reaction from the vehicle.

FIG. 3:

If the electronic control unit detects that within the driving range change the driver wishes, for example, to reverse, or that he has modified his demands to the extent that a wish for interruption 7 is recognized, and if at that time the driving range change is in section 2, then the old driving range change 6 is discontinued and the pressure 5 of the clutch being disengaged is immediately increased again and thereby the clutch being disengaged is immediately closed by way of a shortened shift process, whereby the active driving range change signal 6 is re-emitted and once completed the transmission ratio can at once be adjusted again.

FIG. 4:

If the electronic control unit detects that an interruption of the driving range shift is desired and the vehicle is still in the third section, i.e. the rotational speed is still in the area of the synchronous speed, but that the preceding driving range change has been completed, then the shift-blocking time for preventing alternation is cancelled and the clutch being disengaged is immediately refilled with pressure and re-engaged by means of a shortened or even a normal shifting process. In that way the driving range change signal 6 is re-emitted, and a shift takes place as already described earlier. As soon as the driving range change active signal 6 is no longer being emitted, the transmission ratio can be changed as recognized from the driver's demand. The vehicle thus reacts more rapidly, since as soon as the interruption is detected, a rapid shift can be initiated. In that way the minimum time in the new driving range is cancelled.

FIG. 5:

In this representation the nominal drive output rotational speed 8 is also shown, as the interruption criterion. If the nominal drive output rotational speed becomes smaller by a certain amount during an upshift, this indicates that the driver does not wish to accelerate any more and therefore that the shift should be discontinued. The nominal drive output rotational speed can be determined either directly from the acceleration pedal or, however, it is possible for this information to be obtained by way of an external magnitude, for example RTOS. So long as the nominal drive output rotational speed is increasing in one direction nothing is stored, but when a change of the nominal rotational speed takes place, the value 10 at which this takes place is stored. If the subsequent course of the nominal rotational speed 8 now moves in the other direction, the difference 9 begins increasing further. If that difference 9 exceeds a certain value, the interruption recognition becomes active and the driving range change is discontinued. Depending on the driving conditions at the time, a rapid downshift or a normal downshift can be carried out.

INDEXES

1 First section
2 Second section
3 Third section
4 Pressure of the clutch to be engaged
5 Pressure of the clutch to be disengaged
6 Driving range change active
7 Driving range change discontinued
8 Nominal drive output rotational speed
9 Difference between maximum and minimum value
10 Maximum value of the required nominal drive output rotational speed 8 during a range change
11 Flag, indicating that a shift interruption has been recognized

The invention claimed is:

1. A method of operating a power-split transmission with at least first and second driving ranges such that shifts are made from the first driving range to the second driving range, and a torque-transmitting first clutch which is to be disengaged is actuated in the disengaging direction until the first clutch, to be disengaged, no longer transmits any torque, and a second clutch, which is to be engaged, is actuated in the engaging direction until the second clutch, to be engaged, transmits the torque, the method comprising:

if at least one driving requirement is changed by more than a predefined threshold amount, discontinuing the shift from the first driving range to the second driving range and controlling the first and the second clutches in such a manner that the transmission reverts back to the first driving range.

2. The method according to claim 1, further detecting that a change of the driving requirement exists when, during the shift from the first driving range to the second driving range, at least one of:

a command to reverse is recognized, an angle of an accelerator pedal changes by more than a predefined value, an internal combustion engine, driving the transmission, exceeds a predefined compression, either an external or an internal drive output rotational speed demand exceeds a predefined value, a nominal gradient of the transmission exceeds a predefined value, a high-pressure regulator exceeds a predefined value, at least one of a driving range wish and a driving range restriction is demanded, and a throttle regulator exceeds a predefined value.

3. The method according to claim 1, further comprising during a complete upshift, from the first driving range to the second driving range, after pre-filling of the second clutch to be engaged, three successive sections are traversed, such that in a first section, the second clutch to be engaged is actuated in the engaging direction and thereby transmits torque, in a second section the second clutch to be disengaged is actuated in the disengaging direction until almost no torque is transmitted by the second clutch to be disengaged, and in a third section the change from the first driving range to the second driving range is completed and a transmission ratio is still within range of a synchronous point, and the transmission ratio of the transmission is kept substantially constant within the first section and the second section.

4. The method according to claim 1, further comprising, if the at least one driving requirement changes beyond the predefined threshold within the first section, actuating the second clutch being engaged in the disengaging direction such that the shift is discontinued and, after a predefined time interval, changing a transmission ratio in a continuously variable power branch.

5. The method according to claim 1, further comprising, if the at least one driving requirement changes beyond the predefined threshold within the second section, actuating the first clutch being disengaged in the engaging direction and actuating the second clutch being engaged in the disengaging direction such that the shift is discontinued and, after a predefined time period, adjusting a transmission ratio.

6. The method according to claim 3, further comprising if the at least one driving requirement changes beyond the predefined threshold within the third section, actuating the first clutch being disengaged in the engaging direction and actuating the second clutch being engaged in the disengaging direction such that the shift is discontinued and, after a predefined time period, adjusting the transmission ratio.

7. The method according to claim 1, further comprising the method is used for discontinuation of at least one of an upshift and a downshift.

8. A method of operating a power-split transmission having at least first and second driving ranges, the method comprising:

initiating a shift from the first driving range to the second driving range by actuating a first torque-transmitting clutch in a disengaging direction until the first clutch is unable to transmit torque, and actuating a second clutch in an engaging direction until the second clutch transmits torque; and discontinuing the shift from the first driving range to the second driving range if at least one driving requirement is changed by more than a predefined threshold amount; and controlling the first and the second clutches such that the transmission reverts back to the first driving range in which the first clutch is engaged and the second clutch is disengaged.

* * * * *